Patented Mar. 15, 1932

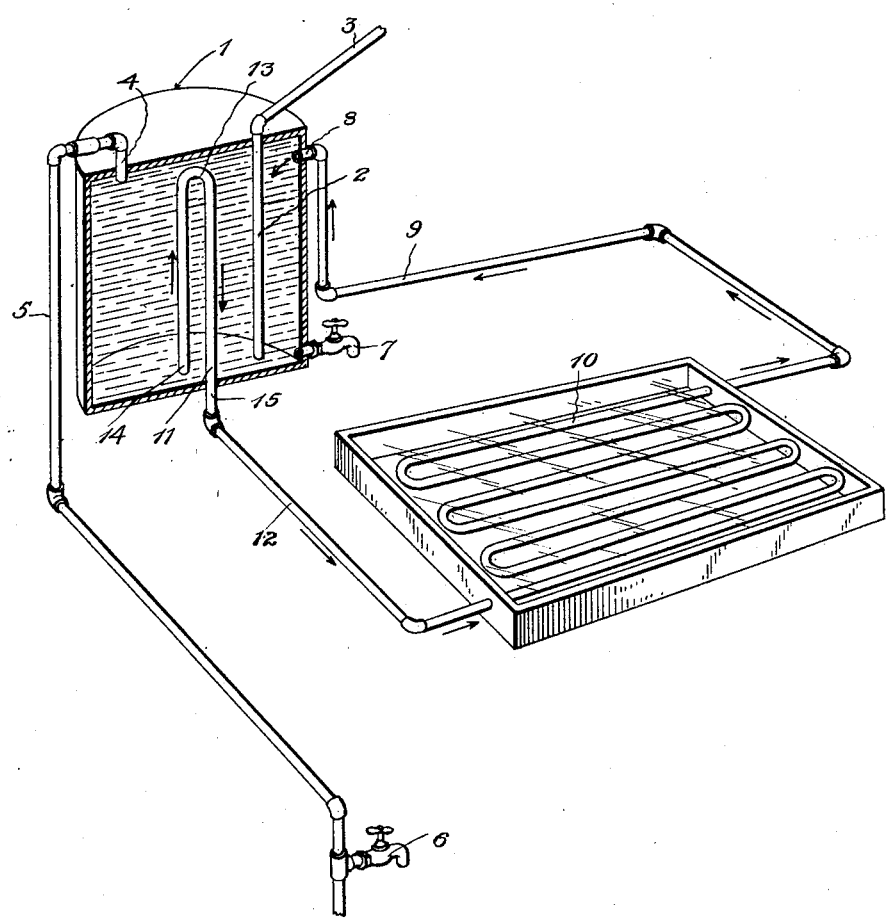

1,849,266

UNITED STATES PATENT OFFICE

FRANK J. BENTZ, OF MIAMI, FLORIDA

HOT WATER STORAGE TANK

Application filed November 12, 1930. Serial No. 495,273.

The invention relates to tanks connected by piping with water heaters, the tank, heater and piping forming a system through which the water circulates as it is heated, the hot water being drawn off from the top of the tank whenever needed, and replaced by cold water discharged into the bottom of the tank from a city or domestic water system.

In tanks of the type above described, cool water from the lower end of the tank passes directly through piping to the water inlet of the heater, and the hot water from the heater passes through piping to the upper end of the tank, but when so conducting the water, circulation is rather sluggish and consequently quite a long period of time elapses before the water in the tank is any where near hot. It has been the object of my invention to overcome this drawback, and I have succeeded by the provision of a new form of return pipe from the hot water storage tank to the cool water inlet pipe of the heater.

A sectional perspective view is shown on the accompanying drawing, the heater being of a type to be heated by the sun's rays, but it is to be understood that the improvement functions to equal advantage regardless of the kind of heater used for the water.

The numeral 1 on the drawing denotes a closed hot water storage tank provided with a cold water conducting pipe 2 extending to its lower end and at its upper end coupled to the water supply pipe 3. The upper end of the tank 1 is provided with a hot water outlet 4 coupled to a discharge line 5 leading to any desired number of spigots such as 6. At its lower end, the tank is preferably provided with a drain cock or spigot 7.

The upper end of the tank 1 is provided with hot water inlet 8 coupled to piping 9 leading from the hot water outlet of a water heater 10. An arched cool water conducting pipe 11 is provided in the tank and is connected by piping 12 with the cool water inlet of the heater 10. The crown 13 of the arched pipe 11 is near the upper end of the tank 1, and the inlet end 14 of said pipe is near the bottom of the tank. The other end 15 of the pipe 11 extends to the exterior of the tank 1 for connection with the pipe 12.

When the heater 10 is functioning, water is circulated as indicated by the arrows. The hot water discharges into the tank 1 through the inlet 8 and relatively cool water from the lower end of said tank passes through the pipes 11 and 12 to the heater. In passing through the pipe 11, the cool water becomes initially heated, due to the fact that the upper portion of said pipe 11 is within the relatively hot water in the upper end of the tank 1. Consequently, the temperature of the water reaching the heater 10 through the pipes 11 and 12, is higher than that which would reach the heater with conventional connecting means between heater and tank. The result is that more rapid circulation takes place, coupled with faster heating of the water.

I claim:—

1. A hot water storage tank having a cold water inlet and a hot water outlet, a hot water inlet into the upper end of said tank adapted for connection with the hot water outlet pipe of a water heater, and an arched cool water outlet pipe from the tank adapted for connection with the cool water inlet pipe of the heater, said arched cool water outlet pipe having its crown within the upper end of said tank, having its inlet end disposed within the lower end of said tank and having is outlet end extended through the lower end of the tank.

2. A hot water storage tank having a cold water inlet and a hot water outlet, a hot water inlet into the upper end of said tank adapted for connection with the hot water outlet pipe of a water heater, and a cool water outlet pipe leading from the lower end of the tank to the exterior of the latter and adapted for connection with the cool water inlet of the heater, said cool water outlet pipe having a portion within the upper end of the tank to be heated by the hot water therein.

In testimony whereof I affix my signature.

FRANK J. BENTZ.